United States Patent [19]

Chen

[11] Patent Number: 5,199,347

[45] Date of Patent: Apr. 6, 1993

[54] PERFORATED STEAM PLATE

[76] Inventor: Kuang-Hsing Chen, 6-1 Fl., No. 22, Lane 106, Ren Jyh St., Taipei, Taiwan

[21] Appl. No.: 931,354

[22] Filed: Aug. 18, 1992

[51] Int. Cl.$^5$ .................. A47J 27/00; A47J 27/04; A47J 37/00

[52] U.S. Cl. ........................... 99/418; 99/415; 99/450; 126/369

[58] Field of Search .................. 99/403, 410, 415–418, 99/449, 450, 485, 646 R; 126/369; 219/401; 210/470, 464; 16/114 R, 114 A

[56] References Cited

U.S. PATENT DOCUMENTS

| | | | |
|---|---|---|---|
| 1,021,133 | 3/1912 | Chaloud, Jr. | 99/418 |
| 1,222,056 | 4/1917 | Wesley | 99/450 |
| 1,228,816 | 6/1917 | Peterson et al. | 99/450 |
| 1,273,119 | 7/1918 | Allis | 99/418 |
| 1,445,788 | 2/1923 | Millican | 99/418 |
| 1,909,983 | 5/1933 | Powell | 99/450 X |
| 2,667,117 | 1/1954 | Millard et al. | 99/418 |
| 3,314,358 | 4/1967 | Burns | 99/415 X |
| 3,392,845 | 7/1968 | Shapiro et al. | 210/470 |
| 3,988,975 | 11/1976 | Buter | 99/415 |
| 4,138,939 | 2/1979 | Feld | 99/418 |

FOREIGN PATENT DOCUMENTS

| | | | |
|---|---|---|---|
| 0376907 | 7/1990 | European Pat. Off. | 99/416 |
| 2835809 | 2/1980 | Fed. Rep. of Germany | 99/450 |

Primary Examiner—Timothy F. Simone
Attorney, Agent, or Firm—Bacon & Thomas

[57] ABSTRACT

A perforated steam plate mainly consists of a retaining plate and an upright tube vertically connected to the retaining plate via a central hole thereof. The retaining plate is a convex plate and therefore allows an adequate space between the retaining plate and the surface on which the retaining plate is positioned. Both the retaining plate and the upright tube have a plurality of perforations evenly formed on their entire surface. When the perforated steam plate is put into a common boiler or a cooker, raw rice to be boiled may be adequately separated from the bottom surface of the boiler or the cooker by the steam plate. In the course of steaming, steam formed by heated water inside the boiler or the cooker permeates from the perforations on the retaining plate and the upright tube to every corners of the boiler or the cooker, making the boiled rice more delicious.

3 Claims, 3 Drawing Sheets

PERFORATED STEAM PLATE

BACKGROUND OF THE INVENTION

The present invention relates to a cooking means placed in an inner boiler in the course of steaming rice.

For most restaurants or various types of meal supplier, gas cookers are used to boil or steam rice. The gas cooker each mainly consists of an outer shell and an inner boiler. To cook the rice, place the raw rice together with adequate amount of fresh water in the inner boiler, and direct heat the bottom of the inner boiler. However, boiled rice at lower part of the inner boiler is usually softer than that at higher part of the inner boiler when such gas cooker are used. This undesired situation is specially obvious when large amount of rice is cooked at a time. What is worse is a failed or burned thermostat of the cooker shall very possibly charred the rice at lower part. To advantageously prevent the rice from becoming charred, a piece of cloth is usually spread in the inner boiler before the clean raw rice is put into the cooker. However, such piece of cloth does not effectively help the raw rice to be evenly boiled. In addition, for sanitary purpose, such cloth must be frequently replaced which will inevitably increase the cost of users.

Therefore, it is desirable to have some kind of means which can be put in a cooker to use with it so as to eliminate the drawbacks that the rice at different parts of the cooker shall be differently boiled, especially when a large amount of rice is to be cooked at a time, and that the lower part of the rice shall accidently become charred.

SUMMARY OF THE INVENTION

The steam plate according to the present invention is generally a retaining plate which may be put in an inner boiler of a cooker at the bottom thereof. The retaining plate is substantially a convex round plate so that there is some space left between the plate and the surface on which the plate is positioned. An upward extending upright tube is centered and connected to the retaining plate. Both the retaining plate and the upright tube are evenly perforated and the diameter of the perforations is somewhat smaller than the cross section of a rice granule. When the raw rice and water are poured into the boiler, the rice granules are separated from the bottom of the boiler by the retaining plate and the upright tube. In the course of steaming, steams formed by the water inside the boiler when the water is heated shall pass the perforations and thereby evenly permeate among the rice granules, causing the rice evenly boiled and therefore tasted more deliciously without charred lower part.

DETAILED DESCRIPTION OF THE PREFERRED EMBODIMENTS

Figure 1:
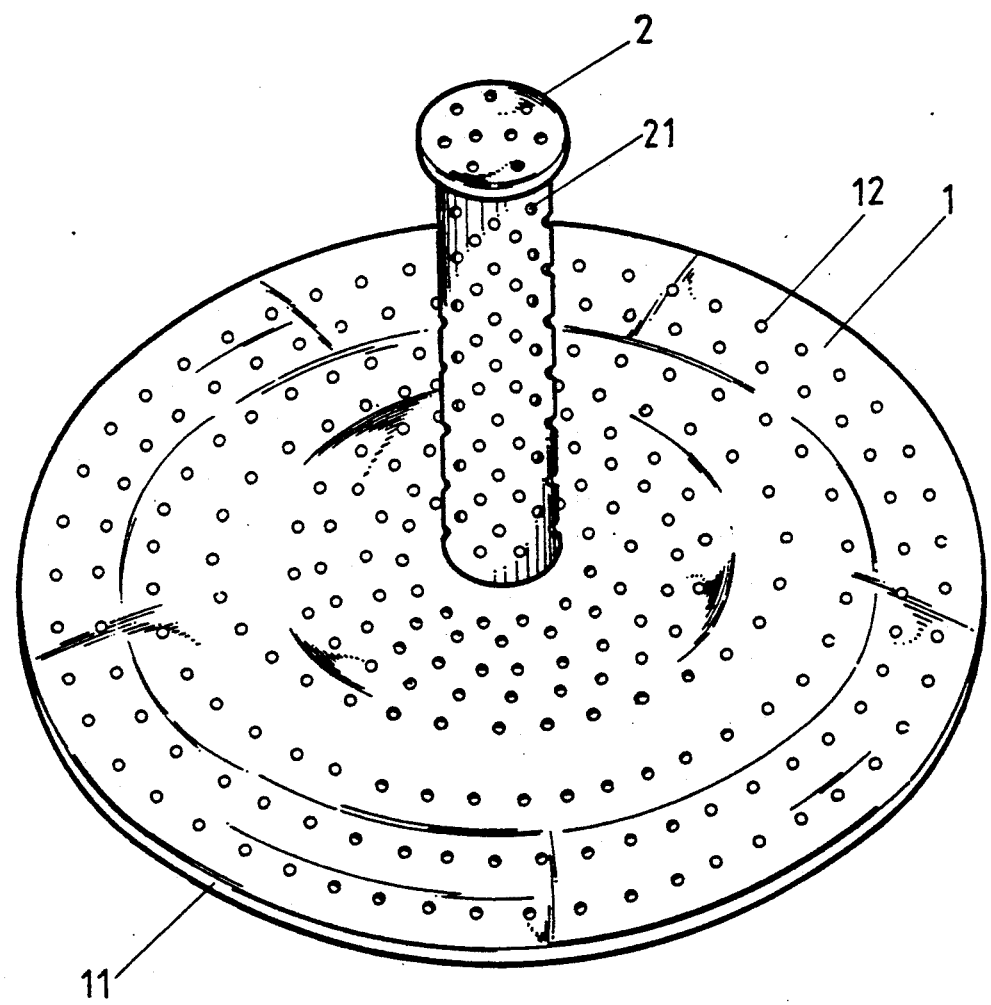
FIG. 1 is a three-dimensional perspective of a steam plate according to the present invention.

Please refer to FIG. 1 in which a perspective of the present invention is shown. The present invention mainly includes a retaining plate 1 and an upright tube 2. The retaining plate 1 is generally a convex plate with a flat periphery 11. The entire surface of the retaining plate 1 is evenly formed of a plurality of perforations 12 of which the diameter is slightly smaller than the cross section of a rice granule. The upright tube 2 is generally a hollow round tube of which the bottom end passes down through an opening centered at the retaining plate 1 while the tube itself vertically and upward projects from the retaining plate 1. The upright tube 2 is also formed of a plurality of perforations 21 on it top surface and tube wall, the diameter of the perforations 21 is slightly smaller than a rice granule, too.

Figures 2, 2A:
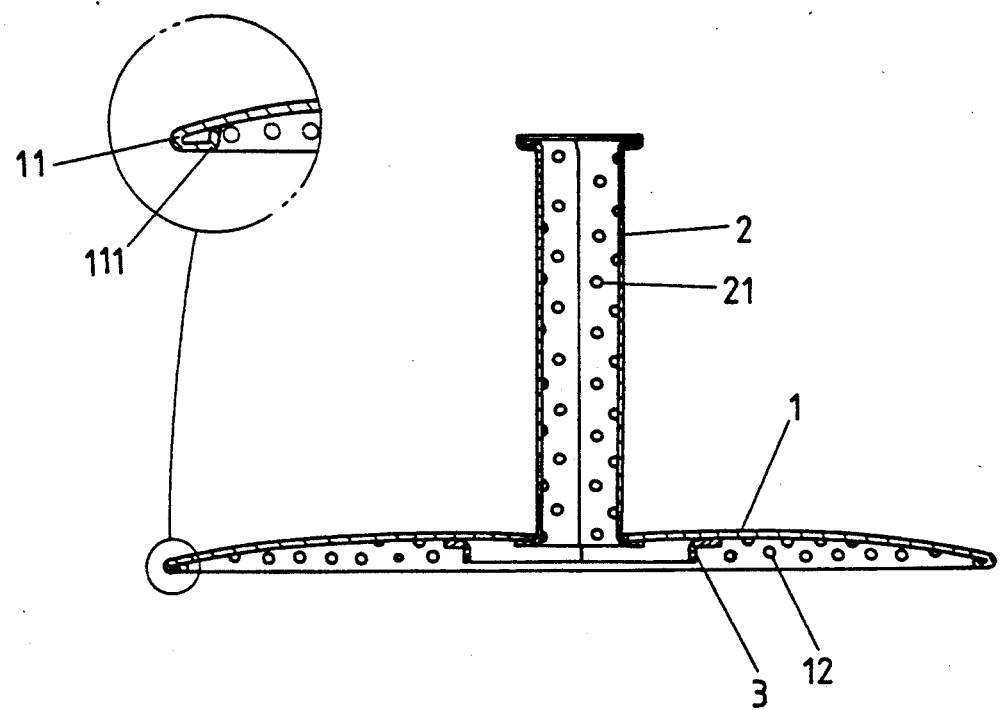
FIG. 2 is a vertically sectional view of the steam plate of the present invention.

Please now refer to FIG. 2. The convex retaining plate 1 allows a space left between it and the surface on which the retaining plate 1 is positioned. The periphery 11 of the retaining plate 1 is formed of an inward and upward bent portion 111 which forms a ring of seat of the retaining plate 1 and reinforces the periphery of the plate 1. An annular reinforcing member 3 is further provided to connect to the bottom surface of the retaining plate 1 around its central point so as to increase the bearing strength of the retaining plate 1. The lowest point of the annular reinforcing member 3 is preferably higher than the bottom surface of the plate periphery 11. The bottom end of the upright tube 2 passes down through a central opening on the retaining plate 1 with its bottom edge flares and connects to the bottom surface of the retaining plate 1.

Figure 3:
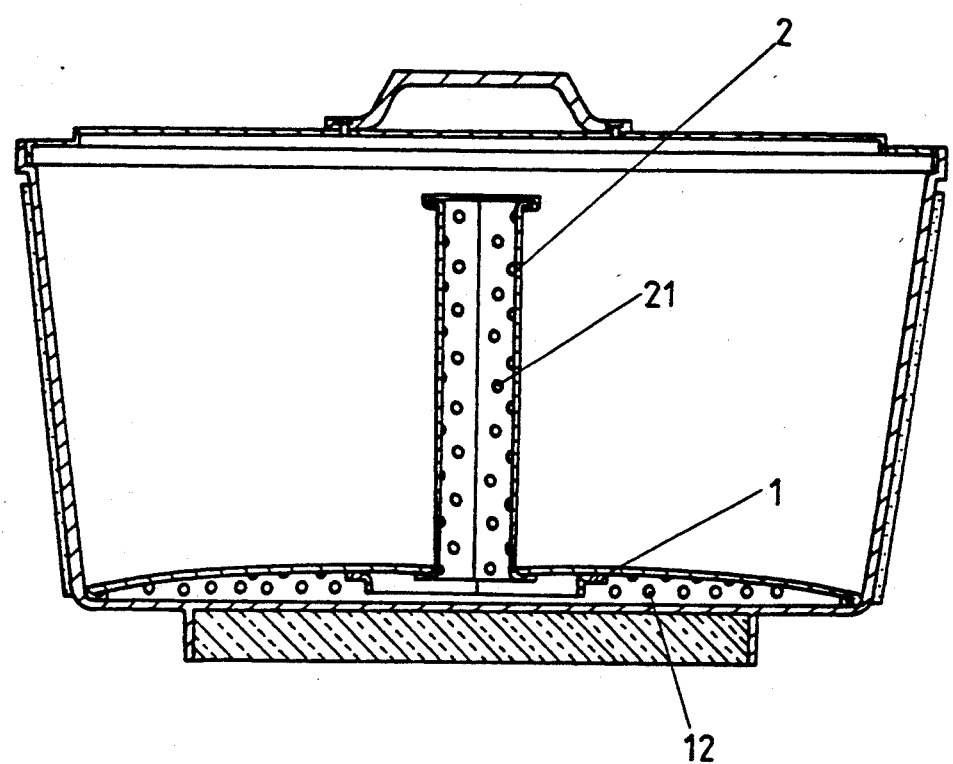
FIG. 3 is a schematic drawing illustrating a steam plate of the present invention having been put in a cooker.

FIG. 3 illustrates a steam plate of the present invention being placed in a cooker. The diameter of the retaining plate 1 is substantially the same as that of an inner bottom of a boiler or cooker. The length of the upright tube 2 is slightly shorter than the height of the boiler or the cooker so that it may be properly positioned therein. Since the perforations 12, 21 on the retaining plate 1 and the upright tube 2, respectively, are smaller than a rice granule in size, when clean raw rice and adequate amount of fresh water are put into the boiler or the cooker, most part of the water and all the raw rice shall be on the retaining plate 1 and/or outside the upright tube 2 while a small amount of water is below the retaining plate 1 and inside the upright tube 2. As a result, when the bottom of the boiler or the cooker is heated, steams formed by heated water inside the boiler or the cooker shall permeate from the perforations 12, 21 on the retaining plate 1 and the upright tube 2, respectively, into every corners of the boiler or the cooker, causing the rice evenly boiled and tasted more delicious.

The retaining plate 1 and the upright tube 2 of the present invention may be made of stainless steel which has much longer usable life and need not to be frequently replaced as it is found in the conventional steaming cloth. On the other hand, the space left between the retaining plate 1 and the bottom of the boiler or the cooker may prevent the lower part rice from becoming charred even if the thermostat of the boil or the cooker is failed.

What is claimed is:

1. A perforated steam plate comprising:
    a substantially convex retaining plate which allows an adequate space to be left between said retaining plate and a surface on which said retaining plate is positioned;
    said retaining plate having a periphery which has an inward and upward bent end portion forming an reinforced seat of said retaining plate, and having a plurality of perforations evenly formed on entire surface thereof; and a hollow and round upright tube having an open bottom end and a covered top end, said open bottom end passing down through said retaining plate via a central hole formed on said retaining plate and connecting to said retaining plate at its bottom surface with a flared periphery; and said upright tube having a plurality of perforations formed on its top end and its tube wall;

said retaining plate and said upright tube being so designed that their sizes correspond to the size of common boilers or cookers and therefore are suitable for being placed in a boiler or a cooker with said periphery and said bent end portion of said retaining plate contacting bottom surface of said boiler or said cooker.

2. A perforated steam plate as claimed in claim 1, wherein said perforations on said retaining plate and said upright tube has a diameter slightly smaller than the cross section of common rice granules.

3. A perforated steam plate as claimed in claim 1, wherein an annular reinforcing member is provided and connected to bottom surface of said retaining plate at adequate position about the center of said retaining plate so as to increase the bearing strength of said retaining plate.

* * * * *